(12) United States Patent
Garwood (10) Patent No.: US 11,263,890 B1
(45) Date of Patent: Mar. 1, 2022

(54) VEHICLE OCCUPANCY REMINDER

(71) Applicant: Carol Garwood, Bronx, NY (US)

(72) Inventor: Carol Garwood, Bronx, NY (US)

( * ) Notice: Subject to any disclaimer, the term of this patent is extended or adjusted under 35 U.S.C. 154(b) by 9 days.

(21) Appl. No.: 17/008,748

(22) Filed: Sep. 1, 2020

(51) Int. Cl.
| | | |
|---|---|---|
| *G08B 21/24* | (2006.01) | |
| *G08B 21/22* | (2006.01) | |
| *G08B 21/02* | (2006.01) | |
| *B60N 2/00* | (2006.01) | |
| *B60R 21/015* | (2006.01) | |
| *B60Q 3/283* | (2017.01) | |
| *B60Q 5/00* | (2006.01) | |
| *B60Q 9/00* | (2006.01) | |
| *G07C 9/00* | (2020.01) | |
| *H04L 5/00* | (2006.01) | |
| *B62D 15/02* | (2006.01) | |

(52) U.S. Cl.
CPC .............. *G08B 21/24* (2013.01); *B60N 2/002* (2013.01); *B60Q 3/283* (2017.02); *B60Q 5/003* (2013.01); *B60Q 9/00* (2013.01); *B60R 21/01526* (2014.10); *B62D 15/029* (2013.01); *G07C 9/00309* (2013.01); *G08B 21/0205* (2013.01); *G08B 21/0277* (2013.01); *G08B 21/22* (2013.01); *H04L 5/0055* (2013.01); *G07C 2009/00769* (2013.01); *G07C 2009/00984* (2013.01)

(58) Field of Classification Search
CPC ................ G08B 21/24; G08B 21/0205; G08B 21/0277; G08B 21/22; B60R 21/01526; B60Q 3/283; B60Q 5/003; B60Q 9/00; B60N 2/002; B62D 12/029; H04L 5/0055; G07C 2009/00769; G07C 2009/00984; G07C 9/00309
See application file for complete search history.

(56) References Cited

U.S. PATENT DOCUMENTS

| | | |
|---|---|---|
| D623,571 S | 9/2010 | Cook |
| 9,014,920 B1 | 4/2015 | Torres |
| 9,266,535 B2 | 2/2016 | Schoenberg |
| 9,308,856 B2 | 4/2016 | Lisseman |
| 9,481,297 B2 | 11/2016 | Salter |
| 9,545,930 B2 | 1/2017 | Ricci |
| 2006/0176183 A1 | 8/2006 | Jetton |
| 2016/0171859 A1* | 6/2016 | Bowlus .................. G08B 21/02 340/457 |
| 2019/0054841 A1* | 2/2019 | Cech ..................... G08B 21/22 |
| 2019/0272755 A1* | 9/2019 | Giorgi .................... H04W 4/40 |

* cited by examiner

*Primary Examiner* — Omeed Alizada
(74) *Attorney, Agent, or Firm* — Kyle A. Fletcher, Esq.

(57) ABSTRACT

The vehicle occupancy reminder is configured for use with a vehicle that is further defined with a vehicle engine control unit (VECU) that generates an ignition off signal and a door open signal. The vehicle occupancy reminder monitors the vehicle for a passenger in a child safety seat. The vehicle occupancy reminder generates a plurality of alarms when: a) a passenger is detected in the child safety seat after the VECU has transmitted an ignition off signal to the vehicle occupancy reminder; or, b) a passenger is detected in the child safety seat after the VECU has transmitted a door open signal to the vehicle occupancy reminder. When the vehicle occupancy reminder detects a selected alarm condition alarm condition, the vehicle occupancy reminder generates a plurality of visual, audible, and tactile alarms that alert an appropriate authority that a selected alarm condition has occured.

18 Claims, 5 Drawing Sheets

VEHICLE OCCUPANCY REMINDER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of physics and signaling including alarms responding to undesired conditions, more specifically, an alarm for ensuring the safety of a person. (F08B21/02)

SUMMARY OF INVENTION

The vehicle occupancy reminder is an alarm system. The vehicle occupancy reminder is configured for use with a vehicle. The vehicle is further defined with a steering wheel and a vehicle engine control unit (VECU). The VECU provides to the vehicle occupancy reminder an ignition off signal and a door open signal. The vehicle occupancy reminder monitors the vehicle for a passenger, such as a toddler or an infant, in a child safety seat. The vehicle occupancy reminder generates an alarm on the occurrence of an alarm selected from the group consisting of: a) a passenger is detected in the child safety seat after the VECU has transmitted an ignition off signal to the vehicle occupancy reminder; b) a passenger is detected in the child safety seat after the VECU has transmitted a door open signal to the vehicle occupancy reminder; and, c) a combination of the conditions (a) and (b) has simultaneously occurred. When the vehicle occupancy reminder detects a selected alarm condition, the vehicle occupancy reminder generates a plurality of visual, audible, and tactile alarms that alert an appropriate authority that a selected alarm condition has occurred.

These together with additional objects, features and advantages of the vehicle occupancy reminder will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle occupancy reminder in detail, it is to be understood that the vehicle occupancy reminder is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle occupancy reminder.

It is therefore important that the claims be regarded as including such equivalent construction insofar as they do not depart from the spirit and scope of the vehicle occupancy reminder. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
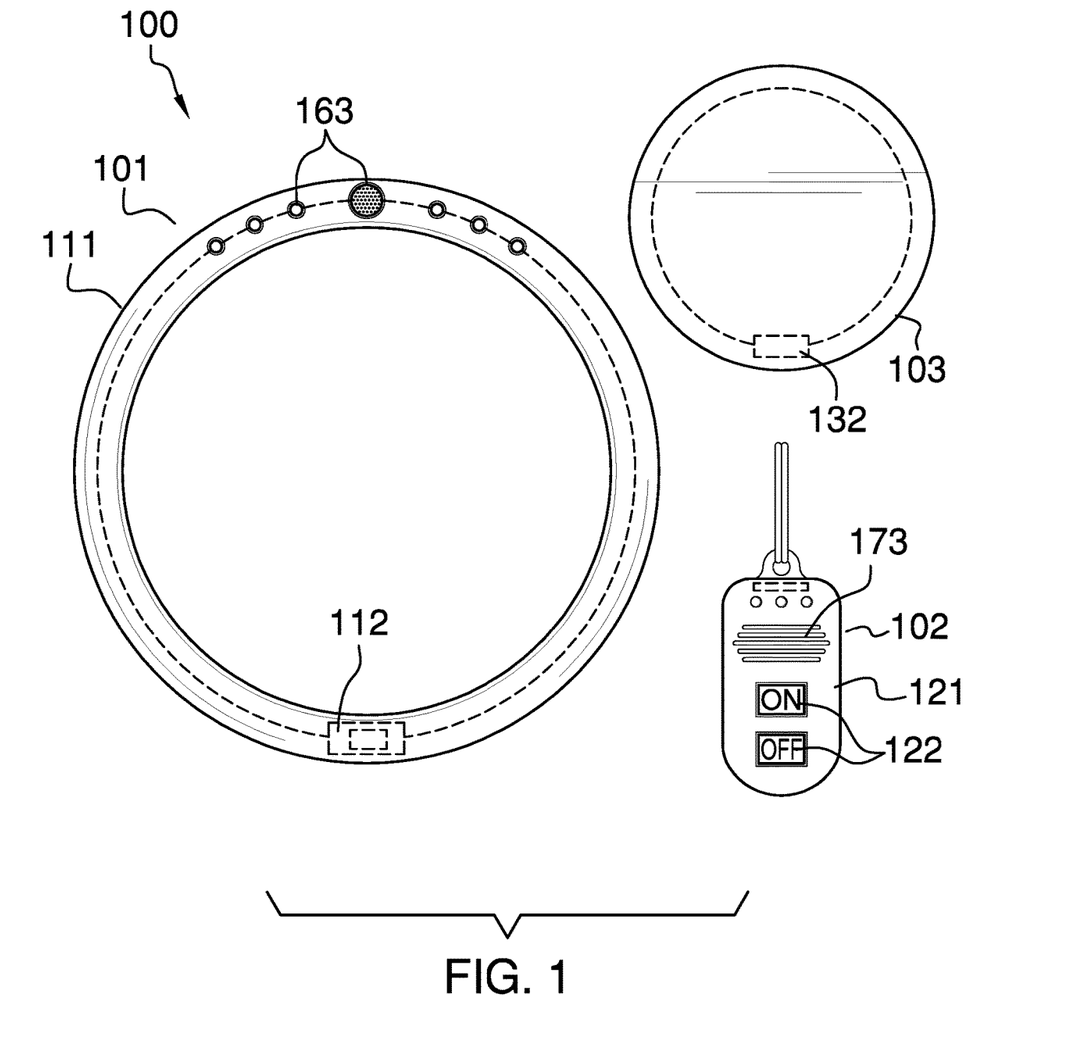
FIG. 1 is a kit view of an embodiment of the disclosure.
Figure 2:
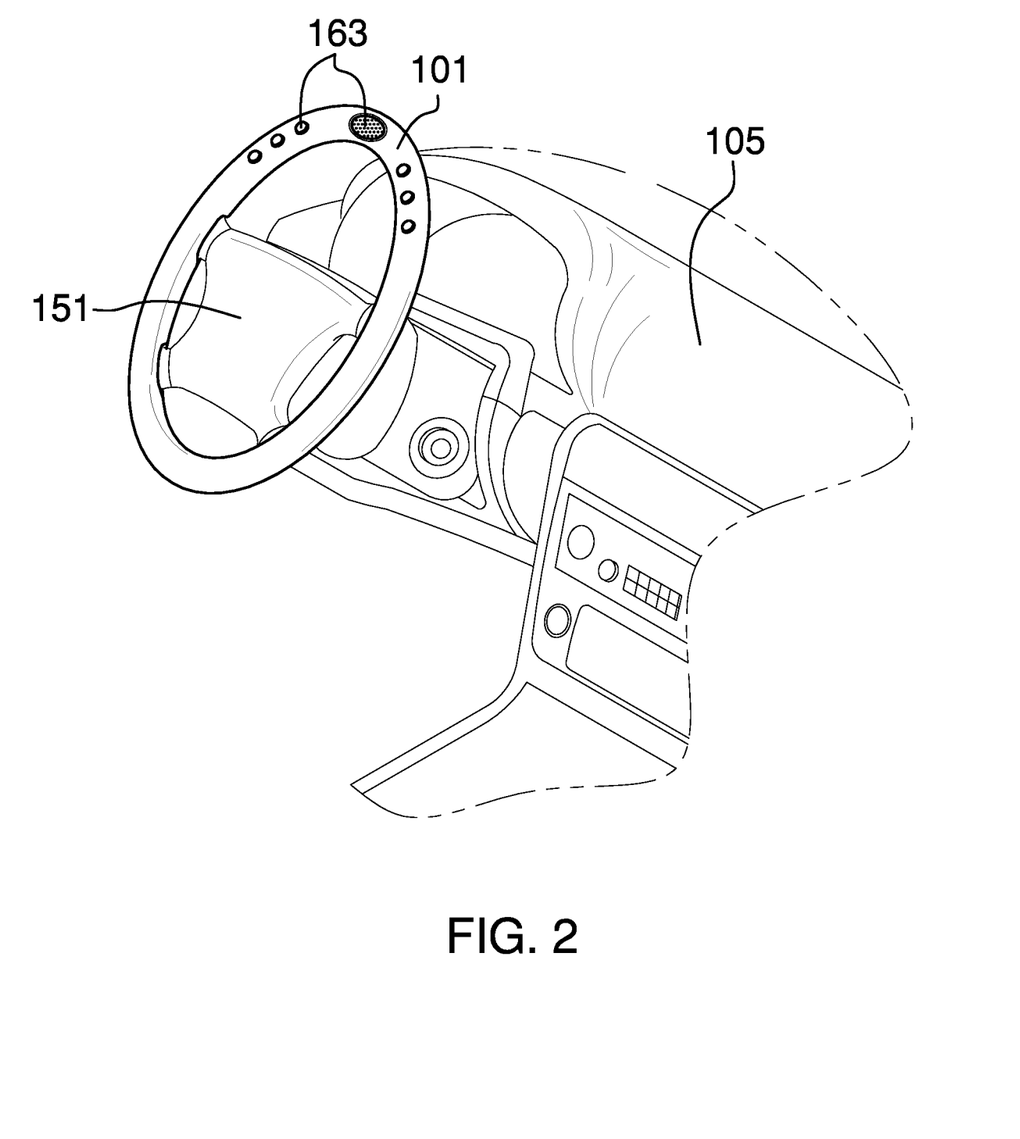
FIG. 2 is an in-use view of an embodiment of the disclosure.
Figure 3:
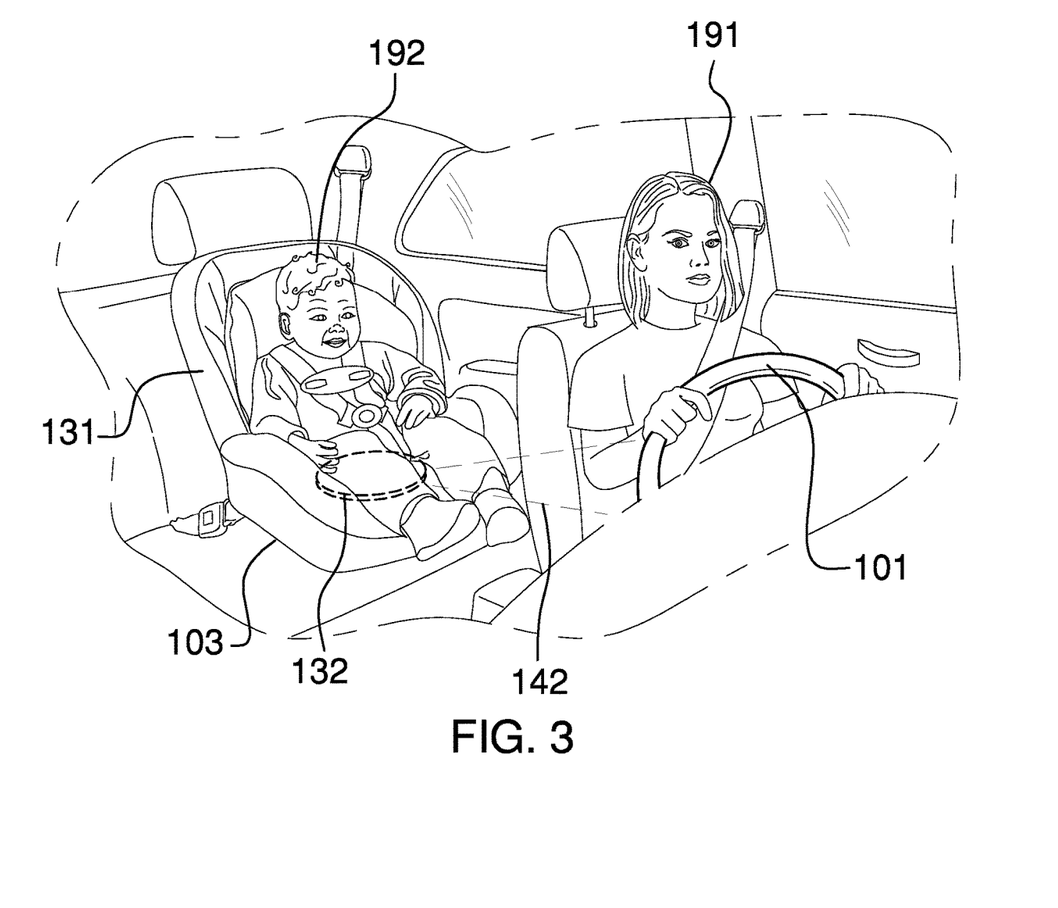
FIG. 3 is an in-use view of an embodiment of the disclosure.
Figure 4:
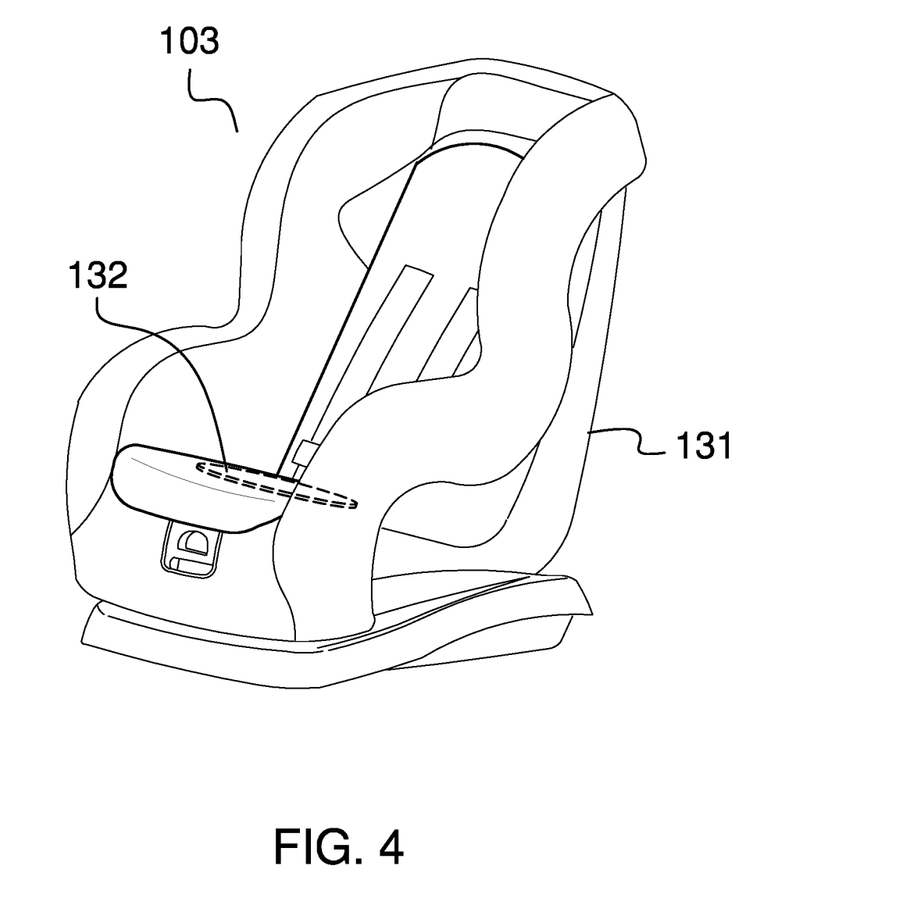
FIG. 4 is a detail view of an embodiment of the disclosure.
Figure 5:
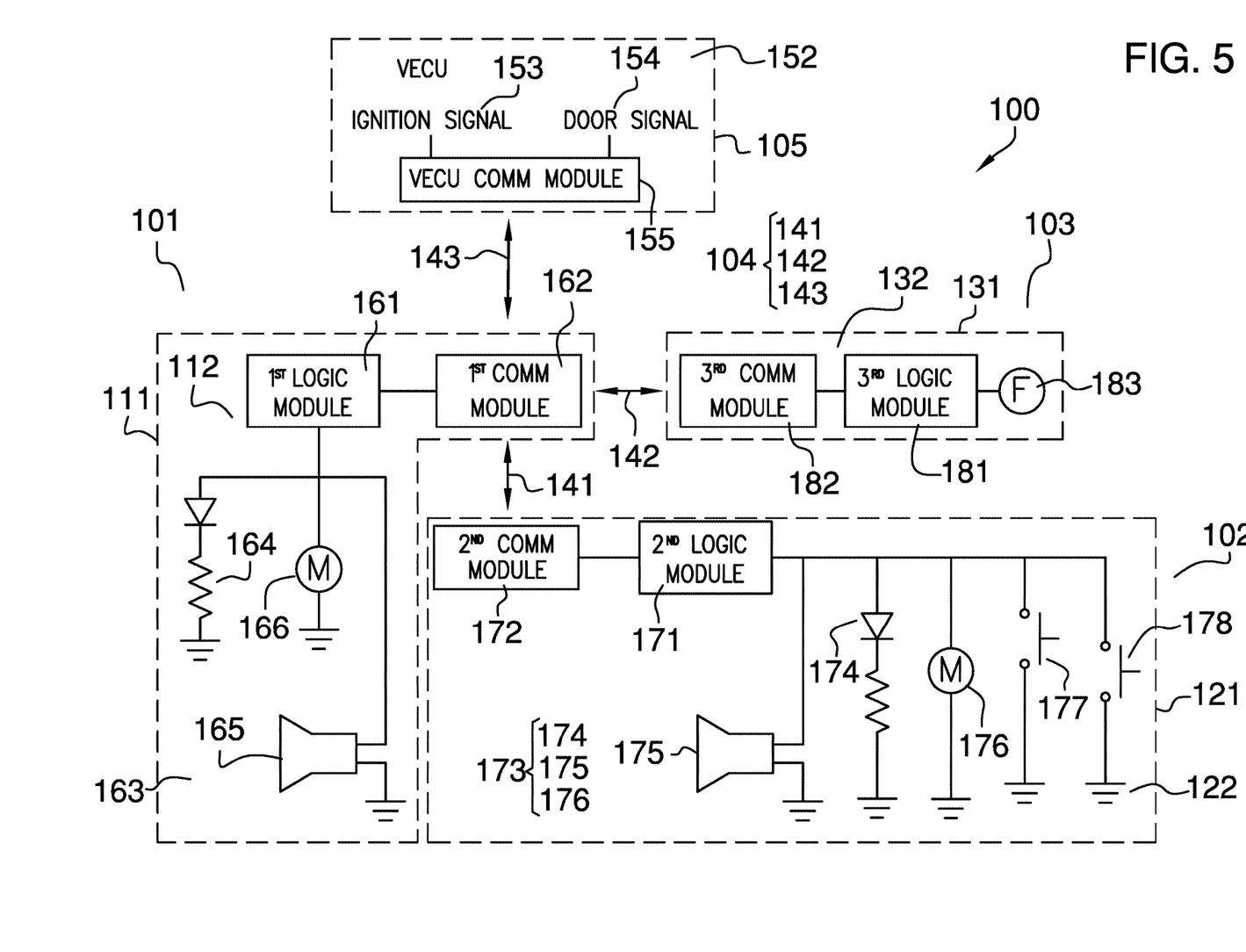
FIG. 5 is a schematic view of an embodiment of the disclosure.

Detailed reference will now be made to one or more potential embodiments of the disclosure, which are illustrated in FIGS. 1 through 5.

The vehicle occupancy reminder 100 (hereinafter invention) is an alarm system. The invention 100 is configured for use with a vehicle 105. The vehicle 105 is further defined with a steering wheel 151 and a vehicle 105 engine control unit 152 (VECU 152). The VECU 152 provides to the invention 100 a VECU 152 ignition off signal 153 and a VECU 152 door open signal 154. The invention 100 monitors the vehicle 105 for a passenger 192, such as a toddler or an infant, in a child safety seat 131.

The invention 100 generates an alarm on the occurrence of an alarm condition selected from the group consisting of: a) a passenger 192 is detected in the child safety seat 131 after the VECU 152 has transmitted a VECU 152 ignition off signal 153 to the invention 100; b) a passenger 192 is detected in the child safety seat 131 after the VECU 152 has transmitted a VECU 152 door open signal 154 to the invention 100; and, c) a combination of the conditions (a) and (b) has simultaneously occurred. When the invention 100 detects a selected alarm condition alarm condition, the invention 100 generates a plurality of visual, audible, and tactile alarms that alert an appropriate authority 191 that a selected alarm condition has occurred.

The vehicle 105, the steering wheel 151, the VECU 152, the child safety seat 131, the passenger 192, and the appropriate authority 191 are defined elsewhere in this disclosure.

The appropriate authority 191 refers to an individual authorized to operate the vehicle 105. The appropriate authority 191 is further assumed to have custody of the passenger 192. The appropriate authority 191 is defined elsewhere in this disclosure. The passenger 192 is defined elsewhere in this disclosure. The disclosure assumes that the passenger 192 is an infant or toddler in the custody of the appropriate authority 191.

The vehicle 105 is defined elsewhere in this disclosure. The vehicle 105 engine control unit 152 is an electric circuit. The vehicle 105 engine control unit 152 controls the overall electrical operation of the vehicle 105. The vehicle 105 engine control unit 152 is abbreviated and defined in this disclosure as the VECU 152.

The VECU 152 ignition off signal 153 is an electrical signal that is generated by the vehicle 105 engine control unit 152. The VECU 152 ignition off signal 153 indicates that the ignition of the vehicle 105 has been turned off. The VECU 152 door open signal 154 is an electrical signal that is generated by the vehicle 105 engine control unit 152. The VECU 152 door open signal 154 indicates that a door into the passenger 192 compartment of the vehicle 105 is open. The VECU 152 communication module 155 is a wireless communication device that transmits the VECU 152 ignition off signal 153 and the VECU 152 door open signal 154 to the steering wheel 151 control circuit 112. The VECU 152 communication module 155 is provisioned as a part of the vehicle 105 engine control unit 152.

Each of the plurality of wireless communication links 104 forms a wireless communication link between the steering wheel 151 cover 101 and an invention 100 element selected from the group consisting of the alarm fob 102, the passenger 192 structure 103, and the vehicle 105. The terms wireless and communication link are defined elsewhere in this disclosure.

The plurality of wireless communication links 104 comprises a first wireless communication link 141, a second wireless communication link 142, and a third wireless communication link 143. The first wireless communication link 141 forms a wireless communication link between the steering wheel 151 cover 101 and the alarm fob 102. The second wireless communication link 142 forms a wireless communication link between the steering wheel 151 cover 101 and the passenger 192 structure 103. The third wireless communication link 143 forms a wireless communication link between the steering wheel 151 cover 101 and the plurality of wireless communication links 104.

The steering wheel 151 cover 101 is a first element of the invention 100. The steering wheel 151 cover 101 is an electric device. The steering wheel 151 cover 101 attaches to the steering wheel 151. The steering wheel 151 cover 101 monitors the alarm fob 102, the passenger 192 structure 103, and the vehicle 105 for one or more alarm conditions. The alarm generated by the steering wheel 151 cover 101 include visual, audible, and tactile alarms.

The steering wheel 151 cover 101 generates an alarm on the occurrence of an alarm condition selected from the group consisting of: a) a passenger 192 is detected in the passenger 192 structure 103 after the vehicle 105 has transmitted a VECU 152 ignition off signal 153 to the steering wheel 151 cover 101; b) a passenger 192 is detected in the passenger 192 structure 103 after the vehicle 105 has transmitted a VECU 152 door open signal 154 to the steering wheel 151 cover 101; and, c) a combination of the conditions (a) and (b) has simultaneously occurred. The steering wheel 151 cover 101 comprises a steering wheel 151 cover 101 sheeting 111 and a steering wheel 151 control circuit 112. The steering wheel 151 control circuit 112 mounts on the steering wheel 151 cover 101 sheeting 111.

The steering wheel 151 cover 101 sheeting 111 is a sheeting structure. The steering wheel 151 control circuit 112 attaches to the sheeting structure that forms the steering wheel 151 cover 101 sheeting 111. The steering wheel 151 cover 101 sheeting 111 wraps around the perimeter of the wheel structure of the steering wheel 151. The steering wheel 151 is defined elsewhere in this disclosure. The steering wheel 151 cover 101 sheeting 111 is formed with all apertures and form factors necessary to allow the alarm fob 102 housing 121 to accommodate the use and operation of the steering wheel 151 control circuit 112. Methods to form an alarm fob 102 housing 121 suitable for the purposes described in this disclosure are well-known and documented in the mechanical arts.

The steering wheel 151 control circuit 112 is an electric circuit. The steering wheel 151 control circuit 112 is the electric circuit that monitors the invention 100 for an alarm condition. The alarm condition is described elsewhere in this disclosure. The steering wheel 151 control circuit 112 initiates a first plurality of alarms 163 when the steering wheel 151 control circuit 112 detects an alarm condition. The steering wheel 151 control circuit 112 transmits an alarm condition message to the alarm fob 102 when the steering wheel 151 control circuit 112 detects an alarm condition.

The steering wheel 151 control circuit 112 receives a VECU 152 ignition off signal 153 from the vehicle 105 engine control unit 152. The steering wheel 151 control circuit 112 receives a VECU 152 door open signal 154 from the vehicle 105 engine control unit 152. The steering wheel 151 control circuit 112 receives a detection message from the passenger 192 structure 103. The VECU 152 ignition off signal 153, the VECU 152 door open signal 154, and the detection messages are used by the steering wheel 151 control circuit 112 to identify an alarm condition. The VECU 152 ignition off signal 153, the VECU 152 door open signal 154, and the detection messages are described elsewhere in this disclosure.

The steering wheel 151 control circuit 112 receives an actuation message from the alarm fob 102. The actuation message signals the steering wheel 151 control circuit 112 to initiate monitoring the invention 100 for an alarm condition. The steering wheel 151 control circuit 112 receives an acknowledgment message from the alarm fob 102. The acknowledgment message signals the steering wheel 151 control circuit 112 to discontinue the operation of the first plurality of alarms 163.

The steering wheel 151 control circuit 112 comprises a first logic module 161, a first communication module 162, and a first plurality of alarms 163. The first logic module 161, the first communication module 162, and the first plurality of alarms 163 are electrically interconnected.

The first logic module 161 is a readily and commercially available programmable electronic device that is used to manage, regulate, and operate the steering wheel 151 control circuit 112. Depending on the specific design and the selected components, the first logic module 161 can be a separate component within the steering wheel 151 control circuit 112 or the functions of the first logic module 161 can be incorporated into another component within the steering wheel 151 control circuit 112.

The first communication module 162 is a wireless electronic communication device that allows the first logic module 161 to wirelessly and simultaneously communicate with the following devices: a) the second communication module 172 of the alarm fob 102 control circuit 122; b) the third communication module 182 of the passenger 192 structure 103 control circuit; and, c) the VECU 152 communication module 155 of the vehicle 105 engine control unit 152. Specifically, the first communication module 162 establishes: d) a first wireless communication link 141 between the first communication module 162 and the second communication module 172 of the alarm fob 102 control circuit 122; e) a second wireless communication link 142 between the first communication module 162 and the third communication module 182 of the passenger 192 structure 103 control circuit; and, c) a third wireless communication link 143 between the first communication module 162 and the VECU 152 communication module 155 of the vehicle 105 engine control unit 152.

In the first potential embodiment of the disclosure, the first communication module 162 supports one or more communication protocols selected from the group consisting of a WiFi™ protocol or a Bluetooth™ protocol.

The first plurality of alarms 163 further comprises a first visual alarm 164, a first audible alarm 165, and a first tactile alarm 166. The first visual alarm 164, the first audible alarm 165, and the first tactile alarm 166 electrically connect to the first logic module 161.

The first visual alarm 164 is a visual alarm that is generated by the first logic module 161. The first visual alarm comprises one or more LEDs and a limit resistor that are electrically connected to the first logic module 161. The first logic module 161 controls the operation of the first visual alarm 164.

The first audible alarm 165 is an audible alarm that is generated by the first logic module 161. The first audible alarm 165 comprises a buzzer that is electrically connected to the first logic module 161. The first logic module 161 controls the operation of the first audible alarm 165. The first tactile alarm 166 is an audible alarm that is generated by the first logic module 161.

The first tactile alarm 166 comprises a vibration motor that is electrically connected to the first logic module 161. The first logic module 161 controls the operation of the first tactile alarm 166.

The alarm fob 102 is a domestic article. The alarm fob 102 is an electric device. The alarm fob 102 is carried by the appropriate authority 191. The alarm fob 102 receives an alarm condition message from the steering wheel 151 cover 101. The alarm fob 102 generates an alarm on the receipt of the alarm condition message. The alarm generated by the alarm fob 102 includes visual, audible, and tactile alarms. The alarm fob 102 transmits an actuation message to the steering wheel 151 cover 101. The alarm fob 102 transmits an acknowledge message to the steering wheel 151 cover 101. The actuation message and the acknowledgment messages are described elsewhere in this disclosure. The alarm fob 102 comprises an alarm fob 102 housing 121 and an alarm fob 102 control circuit 122. The alarm fob 102 control circuit 122 mounts in the alarm fob 102 housing 121.

The alarm fob 102 housing 121 is a rigid casing. The alarm fob 102 housing 121 contains the alarm fob 102 control circuit 122. The alarm fob 102 housing 121 is formed with all apertures and form factors necessary to allow the alarm fob 102 housing to accommodate the use and operation of the alarm fob 102 control circuit 122. Methods to form an alarm fob 102 housing 121 suitable for the purposes described in this disclosure are well-known and documented in the mechanical arts.

The alarm fob 102 control circuit 122 is an electric circuit. The alarm fob 102 control circuit 122 is carried by the appropriate authority 191. The alarm fob 102 control circuit 122 receives the alarm condition message. The alarm fob 102 control circuit 122 initiates a second plurality of alarms 173 upon receipt of the alarm condition message. The appropriate authority 191 initiates the generation of an actuation message from the alarm fob 102 to the steering wheel 151 control circuit 112. The alarm fob 102 control circuit 122 initiates the generation of an acknowledgment message from the alarm fob 102 to the steering wheel 151 control circuit 112. The initiation of the acknowledgment message further causes the alarm fob 102 control circuit 122 to discontinue the operation of the second plurality of alarms 173.

The alarm fob 102 control circuit 122 comprises a second logic module 171, a second communication module 172, and a second plurality of alarms 173. The alarm fob 102 control circuit 122 further comprises an actuation switch 177 and an acknowledgment switch 178. The second logic module 171, the second communication module 172, the second plurality of alarms 173, the actuation switch 177, and the acknowledgment switch 178 are electrically connected.

The actuation switch 177 is a momentary switch. The actuation switch 177 is monitored by the second logic module 171. The acknowledgment switch 178 is a momentary switch. The acknowledgment switch 178 is monitored by the second logic module 171.

The second logic module 171 is a readily and commercially available programmable electronic device that is used to manage, regulate, and operate the alarm fob 102 control circuit 122. Depending on the specific design and the selected components, the second logic module 171 can be a separate component within the alarm fob 102 control circuit 122 or the functions of the second logic module 171 can be incorporated into another component within the alarm fob 102 control circuit 122.

The second communication module 172 of the alarm fob 102 control circuit 122 is a wireless electronic communication device that allows the second logic module 171 to wirelessly communicate with the first communication module 162 of the steering wheel 151 control circuit 112. Specifically, the second communication module 172 establishes the first wireless communication link 141 between the first communication module 162 and the second communication module 172.

The steering wheel 151 control circuit 112 transmits over the first wireless communication link 141 a message indicating to the alarm fob 102 control circuit 122 that the steering wheel 151 control circuit 112 has detected an alarm condition. In response to the receipt of the alarm condition message, the alarm fob 102 control circuit 122 initiates the operation of the second plurality of alarms 173.

The alarm fob 102 control circuit 122 transmits over the first wireless communication link 141 an actuation message indicating to the steering wheel 151 control circuit 112 that the actuation switch 177 has been actuated. Upon receipt of the actuation message, the steering wheel 151 control circuit 112 initiates monitoring the invention 100 for an alarm condition. The alarm fob 102 control circuit 122 transmits over the first wireless communication link 141 an acknowledgment message indicating to the steering wheel 151 control circuit 112 that the acknowledgment switch 178 has been actuated. Upon receipt of the acknowledgment message, the steering wheel 151 control circuit 112 disables all generated alarms and discontinues monitoring the invention 100 for an alarm condition.

The second plurality of alarms 173 comprises a second visual alarm 174, a second audible alarm 175, and a second tactile alarm 176. The second visual alarm 174, the second audible alarm 175, and the second tactile alarm 176 electrically connect to the second logic module 171.

The second visual alarm 174 is a visual alarm that is generated by the second logic module 171. The second visual alarm 174 comprises one or more LEDs and a limit resistor that are electrically connected to the second logic module 171. The second logic module 171 controls the operation of the second visual alarm 174.

The second audible alarm 175 is an audible alarm that is generated by the second logic module 171. The second audible alarm 175 comprises a buzzer that is electrically connected to the second logic module 171. The second logic module 171 controls the operation of the second audible alarm 175.

The second tactile alarm 176 is an audible alarm that is generated by the second logic module 171. The second tactile alarm 176 comprises a vibration motor that is electrically connected to the second logic module 171. The second logic module 171 controls the operation of the second tactile alarm 176.

The passenger 192 structure 103 is an electric device. The passenger 192 structure 103 mounts in the vehicle 105. The passenger 192 structure 103 is adapted to form a seat for a passenger 192 in the vehicle 105. The passenger 192 structure 103 detects the presence of the passenger 192 sitting in the passenger 192 structure 103. The passenger 192 structure 103 transmits a detection message to the steering wheel 151 cover 101. The detection message is described elsewhere in this disclosure. The passenger 192 structure 103 comprises a child safety seat 131 and a passenger 192 structure 103 control circuit 132. The passenger 192 structure 103 control circuit mounts in the child safety seat 131.

The child safety seat 131 forms the mechanical structure in which the passenger 192 sits. The child safety seat 131 is defined elsewhere in this disclosure.

The passenger 192 structure 103 control circuit 132 is an electric circuit. The passenger 192 structure 103 control circuit 132 mounts in the child safety seat 131. The passenger 192 structure 103 control circuit 132 detects the presence of a passenger 192 in the child safety seat 131. The passenger 192 structure 103 control circuit 132 transmits a detection message to the steering wheel 151 control circuit 112 when the passenger 192 structure 103 control circuit 132 detects a passenger 192 in the child safety seat 131. The passenger 192 structure 103 control circuit 132 comprises a third logic module 181, a third communication module 182, and a force sensor 183. The third logic module 181, the third communication module 182, and the force sensor 183 are electrically interconnected.

The third logic module 181 is a readily and commercially available programmable electronic device that is used to manage, regulate, and operate the passenger 192 structure 103 control circuit 132. Depending on the specific design and the selected components, the third logic module 181 can be a separate component within the passenger 192 structure 103 control circuit 132 or the functions of the third logic module 181 can be incorporated into another component within the passenger 192 structure 103 control circuit 132.

The third communication module 182 of the passenger 192 structure 103 control circuit 132 is a wireless electronic communication device that allows the third logic module 181 to wirelessly communicate with the first communication module 162 of the steering wheel 151 control circuit 112. Specifically, the third communication module 182 establishes the second wireless communication link 142 between the first communication module 162 and the third communication module 182.

The passenger 192 structure 103 control circuit 132 transmits over the second wireless communication link 142 a detection message indicating to the steering wheel 151 control circuit 112 that the force sensor 183 has been actuated. Upon receipt of the detection message, the steering wheel 151 control circuit 112 continues to monitor the alarm.

The force sensor 183 is a sensor used to detect the weight of a passenger 192 who is sitting in the child safety seat 131. The third logic module 181 monitors the force sensor 183 to determine if a passenger 192 is in the child safety seat 131. The force sensor 183 is positioned within the child safety seat 131 such that the weight of the passenger 192 rests on the force sensor 183. In the first potential embodiment of the disclosure, the force sensor 183 is a piezoelectric device. The force sensor 183 is defined elsewhere in this disclosure.

The following definitions were used in this disclosure:

Appropriate Authority: As used in this disclosure, an appropriate authority is a previously determined person who has been authorized to operate a device.

Bluetooth™: As used in this disclosure, Bluetooth™ is a standardized communication protocol that is used to wirelessly interconnect electronic devices.

Buzzer: As used in this disclosure, a buzzer is two lead electrical device that generates an audible sound when voltage is applied to the two leads.

Child Safety Seat: As used in this disclosure, a child safety seat is a safety device configured for use with an automobile. The child safety seat is a restraining device that protects a child from injury should an unfortunate event occur to the automobile.

Communication Link: As used in this disclosure, a communication link refers to the structured exchange of data between two objects.

Custody: As used in this disclosure, custody refers to an object or person that is under the physical control or care of a custodian. The custodian is an appropriate authority responsible for the proper operation, appropriate use, or well-being of the object or person that is in custody.

Diode: As used in this disclosure, a diode is a two terminal semiconductor device that allows current flow in only one direction. The two terminals are called the anode and the cathode. Electric current is allowed to pass from the anode to the cathode.

Domestic Article: As used in this disclosure, a domestic article is an item or object: 1) that is commonly found within a household; or, 2) that is commonly carried or worn by a person. Examples of domestic articles include, but are not limited to, clothing, keys and key fobs, personal data devices, glasses, remote controls, or personal storage items such as purses, briefcases, wallets, or cases.

Fob: As used in this disclosure, a fob is a container that: a) contains an electric circuit; and, b) is carried by a person as a domestic article.

Force: As used in this disclosure, a force refers to a net (or unopposed) measurable interaction that changes the direction of motion of an object, the velocity of motion of an object, the momentum of an object, or the stress within an object.

Force Sensor: As used in this disclosure, the force sensor is a sensor that generates an electrically measurable signal that is a function of the amount of force applied to the force sensor. The force sensor is often referred to as a pressure sensor. The force sensor commonly measures force using the piezoelectric effect generated by the deformation of a material.

Form Factor: As used in this disclosure, the term form factor refers to the size and shape of an object.

Housing: As used in this disclosure, a housing is a rigid structure that encloses and protects one or more devices.

Infant: As used in this disclosure, an infant refers to a human child who: 1) is under 18 months old; and, 2) has not yet learned to walk.

LED: As used in this disclosure, an LED is an acronym for a light emitting diode. A light emitting diode is a diode that is also a light source.

Limit Resistor: As used in this disclosure, a limit resistor is an electrical resistor that is used to limit the flow of electric current through an electrical circuit.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Momentary Switch: As used in this disclosure, a momentary switch is a biased switch in the sense that the momentary switch has a baseline position that only changes when the momentary switch is actuated (for example when a pushbutton switch is pushed or a relay coil is energized). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Passenger: As used in this disclosure, a passenger is an individual that is transported by a vehicle.

Resistance: As used in this disclosure, resistance refers to the opposition provided by an electrical circuit (or circuit element) to the electrical current created by a DC voltage is presented across the electrical circuit (or circuit element). The term impedance is often used for resistance when referring to an AC voltage that is presented across the electrical circuit (or circuit element).

Resistor: As used in this disclosure, a resistor is a well-known and commonly available electrical device that presents a resistance that inhibits the flow of electricity through an electric circuit. Within an electric circuit processing alternating currents, the resistor will not affect the phase of the alternating current. A current flowing through a resistor will create a voltage across the terminals of the resistor.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Speaker: As used in this disclosure, a speaker is an electrical transducer that converts an electrical signal into an audible sound.

Steering Wheel: As used in this disclosure, a steering wheel is a rotating device used to change the direction of travel of a vehicle. The steering wheel is modeled after a wheel and comprises a rim, one or more spokes, and a column mount. The column mount attaches the steering wheel to the steering column of the vehicle. The column is a linkage that transmits the rotation of the steering wheel to the drive mechanism of the vehicle which subsequently changes the direction of travel of the vehicle.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Toddler: As used in this disclosure, a toddler is a human child between the ages of one and three who has learned to walk.

Transducer: As used in this disclosure, a transducer is a device that converts a physical quantity, such as pressure or brightness into an electrical signal or a device that converts an electrical signal into a physical quantity.

Unfortunate Event: As used in this disclosure, an unfortunate event is an incident that: 1) happens unexpectedly; 2) happens unintentionally; and, 3) has the potential to cause injury and or property damage.

VECU: As used in this disclosure, the VECU is an acronym for the Vehicle Engine Control Unit of the vehicle. The VECU is an electronic device that controls the operation of all electrical subsystems within a vehicle.

Vehicle: As used in this disclosure, a vehicle is a motorized device that is used for transporting passengers, goods, or equipment. The term motorized vehicle refers to a vehicle can move under power provided by an electric motor or an internal combustion engine.

Vibration Motor: As used in this disclosure, a vibration motor is an electric motor that rotates an unbalanced weight in such a manner that the electric motor vibrates during operation. The vibration can be varied by varying the rotational speed of the vibration motor. The rotational speed is varied by varying the electric current flowing through the vibration motor.

WiFi™: As used in this disclosure, WiFi™ refers to the physical implementation of a collection of wireless electronic communication standards commonly referred to as IEEE 802.11x.

Wireless: As used in this disclosure, wireless is an adjective that is used to describe a communication channel between two devices that does not require the use of physical cabling.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A vehicle occupancy reminder device comprising wherein the vehicle occupancy reminder device comprises a steering wheel cover, an alarm fob, a passenger structure, and a plurality of wireless communication links;
    wherein the vehicle occupancy reminder device an alarm system;
    wherein the vehicle occupancy reminder device is configured for use with a vehicle;
    wherein the vehicle is further defined with a steering wheel and a vehicle engine control unit (VECU);
    wherein each of the plurality of wireless communication links forms a wireless communication link between the steering wheel cover and a device selected from the group consisting of the alarm fob, the passenger structure, and the vehicle;
    wherein the steering wheel cover is an electric device; wherein the steering wheel cover attaches to the steering wheel; wherein the steering wheel cover monitors the alarm fob, the passenger structure, and the vehicle for one or more alarm conditions; wherein the steering wheel cover generates an alarm on the occurrence of an alarm condition selected from the group consisting of: a) a passenger is detected in the passenger structure after the vehicle has transmitted a VECU ignition off signal to the steering wheel cover; b) a passenger is detected in the passenger structure after the vehicle has transmitted a VECU door open signal to the steering wheel cover; and, c) a combination of the conditions (a) and (b) has simultaneously occurred.

2. The vehicle occupancy reminder device according to claim 1
    wherein the VECU provides to the vehicle occupancy reminder device a VECU ignition off signal and a VECU door open signal;
    wherein the vehicle occupancy reminder device monitors the vehicle for a passenger in a child safety seat in the vehicle;
    wherein the vehicle occupancy reminder device generates an alarm on the occurrence of an alarm condition selected from the group consisting of: a) a passenger is detected in the child safety seat after the VECU has transmitted a VECU ignition off signal to the vehicle occupancy reminder device; b) a passenger is detected in the child safety seat after the VECU has transmitted a VECU door open signal to the vehicle occupancy reminder device; and, c) a combination of the conditions (a) and (b) has simultaneously occurred.

3. The vehicle occupancy reminder device according to claim 2
    wherein the vehicle engine control unit is an electric circuit;
    wherein the vehicle engine control unit controls the overall electrical operation of the vehicle;
    wherein the vehicle engine control unit is known as the VECU;
    wherein the VECU ignition off signal is an electrical signal that is generated by the vehicle engine control unit;
    wherein the VECU ignition off signal indicates that the ignition of the vehicle has been turned off;
    wherein the VECU door open signal is an electrical signal that is generated by the vehicle engine control unit;
    wherein the VECU door open signal indicates that a door into the passenger compartment of the vehicle is open;
    wherein the VECU communication module is a wireless communication device that transmits the VECU ignition off signal and the VECU door open signal to the steering wheel control circuit.

4. The vehicle occupancy reminder device according to claim 3
    wherein the plurality of wireless communication links comprises a first wireless communication link, a second wireless communication link, and a third wireless communication link;
    wherein the first wireless communication link forms a wireless communication link between the steering wheel cover and the alarm fob;
    wherein the second wireless communication link forms a wireless communication link between the steering wheel cover and the passenger structure;
    wherein the third wireless communication link forms a wireless communication link between the steering wheel cover and the plurality of wireless communication links.

5. The vehicle occupancy reminder device according to claim 1 wherein the alarm fob is a domestic article; wherein the alarm fob is an electric device; wherein the alarm fob is carried by the appropriate authority; wherein the alarm fob receives an alarm condition message from the steering wheel cover; wherein the alarm fob generates an alarm on the receipt of the alarm condition message; wherein the alarm fob transmits an actuation message to the steering wheel cover; wherein the alarm fob transmits an acknowledge message to the steering wheel cover.

6. The vehicle occupancy reminder device according to claim 5
    wherein the passenger structure is an electric device;
    wherein the passenger structure mounts in the vehicle;
    wherein the passenger structure is adapted to form a seat for a passenger in the vehicle;
    wherein the passenger structure detects the presence of the passenger sitting in the passenger structure;
    wherein the passenger structure transmits a detection message to the steering wheel cover.

7. The vehicle occupancy reminder device according to claim 6
    wherein the steering wheel cover comprises a steering wheel cover sheeting and a steering wheel control circuit;
    wherein the steering wheel control circuit mounts on the steering wheel cover sheeting;
    wherein the alarm fob comprises an alarm fob housing and an alarm fob control circuit;
    wherein the alarm fob control circuit mounts in the alarm fob housing;
    wherein the passenger structure comprises a child safety seat and a passenger structure control circuit;
    wherein the passenger structure control circuit mounts in the child safety seat.

8. The vehicle occupancy reminder device according to claim 7
    wherein the steering wheel cover sheeting is a sheeting structure;
    wherein the steering wheel control circuit attaches to the sheeting structure that forms the steering wheel cover sheeting;

wherein the steering wheel cover sheeting wraps around the perimeter of the wheel structure of the steering wheel;

wherein the alarm fob housing is a rigid casing;

wherein the alarm fob housing contains the alarm fob control circuit;

wherein the child safety seat forms the mechanical structure in which the passenger sits.

9. The vehicle occupancy reminder device according to claim 8 wherein the steering wheel control circuit is an electric circuit;

wherein the steering wheel control circuit is the electric circuit that monitors the vehicle occupancy reminder device for an alarm condition;

wherein the steering wheel control circuit initiates a first plurality of alarms when the steering wheel control circuit detects an alarm condition;

wherein the steering wheel control circuit transmits the alarm condition message to the alarm fob when the steering wheel control circuit detects an alarm condition;

wherein the steering wheel control circuit receives a VECU ignition off signal from the vehicle engine control unit;

wherein the steering wheel control circuit receives a VECU door open signal from the vehicle engine control unit; wherein the steering wheel control circuit receives the detection message from the passenger structure;

wherein the VECU ignition off signal, the VECU door open signal, and the detection messages are used by the steering wheel control circuit to identify an alarm condition;

wherein the steering wheel control circuit receives the actuation message from the alarm fob;

wherein the actuation message signals the steering wheel control circuit to initiate monitoring the vehicle occupancy reminder device for an alarm condition;

wherein the steering wheel control circuit receives the acknowledgment message from the alarm fob;

wherein the acknowledgment message signals the steering wheel control circuit to discontinue the operation of the first plurality of alarms.

10. The vehicle occupancy reminder device according to claim 9 wherein the alarm fob control circuit is an electric circuit;

wherein the alarm fob control circuit is carried by the appropriate authority;

wherein the alarm fob control circuit receives the alarm condition message;

wherein the alarm fob control circuit initiates a second plurality of alarms upon receipt of the alarm condition message;

wherein the appropriate authority initiates the generation of the actuation message from the alarm fob to the steering wheel control circuit;

wherein the alarm fob control circuit initiates the generation of the acknowledgment message from the alarm fob to the steering wheel control circuit;

wherein the initiation of the acknowledgment message further causes the alarm fob control circuit to discontinue the operation of the second plurality of alarms.

11. The vehicle occupancy reminder device according to claim 10 wherein the passenger structure control circuit is an electric circuit;

wherein the passenger structure control circuit mounts in the child safety seat;

wherein the passenger structure control circuit detects the presence of a passenger in the child safety seat;

wherein the passenger structure control circuit transmits the detection message to the steering wheel control circuit when the passenger structure control circuit detects a passenger in the child safety seat.

12. The vehicle occupancy reminder device according to claim 11 wherein the steering wheel control circuit comprises a first logic module, a first communication module, and a first plurality of alarms;

wherein the first logic module, the first communication module, and the first plurality of alarms are electrically interconnected;

wherein the alarm fob control circuit comprises a second logic module, a second communication module, and a second plurality of alarms;

wherein the alarm fob control circuit further comprises an actuation switch and an acknowledgment switch;

wherein the second logic module, the second communication module, the second plurality of alarms, the actuation switch, and the acknowledgment switch are electrically connected;

wherein the passenger structure control circuit comprises a third logic module, a third communication module, and a force sensor;

wherein the third logic module, the third communication module, and the force sensor are electrically interconnected.

13. The vehicle occupancy reminder device according to claim 12 wherein the first logic module is a programmable electronic device;

wherein the first communication module is a wireless electronic communication device that allows the first logic module to wirelessly and simultaneously communicate with the following devices: a) the second communication module of the alarm fob control circuit; b) the third communication module of the passenger structure control circuit; and, c) the VECU communication module of the vehicle engine control unit;

wherein the first communication module establishes: d) a first wireless communication link between the first communication module and the second communication module of the alarm fob control circuit; e) a second wireless communication link between the first communication module and the third communication module of the passenger structure control circuit; and, c) a third wireless communication link between the first communication module and the VECU communication module of the vehicle engine control unit.

14. The vehicle occupancy reminder device according to claim 13 wherein the second logic module is a programmable electronic device;

wherein the second communication module of the alarm fob control circuit is a wireless electronic communication device;

wherein the second communication module establishes the first wireless communication link between the first communication module and the second communication module;

wherein the steering wheel control circuit transmits over the first wireless communication link the alarm condition message to the alarm fob control circuit;

wherein in response to the receipt of the alarm condition message, the alarm fob control circuit initiates the operation of the second plurality of alarms;

wherein the alarm fob control circuit transmits over the first wireless communication link the actuation message indicating to the steering wheel control circuit that the actuation switch has been actuated;

wherein upon receipt of the actuation message, the steering wheel control circuit initiates monitoring the vehicle occupancy reminder device for an alarm condition;

wherein the alarm fob control circuit transmits over the first wireless communication link the acknowledgment message indicating to the steering wheel control circuit that the acknowledgment switch has been actuated;

wherein upon receipt of the acknowledgment message, the steering wheel control circuit disables all generated alarms and discontinues monitoring the vehicle occupancy reminder device for an alarm condition;

wherein the actuation switch is a momentary switch;

wherein the actuation switch is monitored by the second logic module;

wherein the acknowledgment switch is a momentary switch;

wherein the acknowledgment switch is monitored by the second logic module.

15. The vehicle occupancy reminder device according to claim 14 wherein the third logic module is a programmable electronic device;

wherein the third communication module of the passenger structure control circuit is a wireless electronic communication device;

wherein the third communication module establishes the second wireless communication link between the first communication module and the third communication module;

wherein the passenger structure control circuit transmits over the second wireless communication link the detection message indicating to the steering wheel control circuit that the force sensor has been actuated;

wherein upon receipt of the detection message, the steering wheel control circuit continues to monitor the alarm.

16. The vehicle occupancy reminder device according to claim 15 wherein the first plurality of alarms further comprises a first visual alarm, a first audible alarm, and a first tactile alarm;

wherein the first visual alarm, the first audible alarm, and the first tactile alarm electrically connect to the first logic module;

wherein the second plurality of alarms comprises a second visual alarm, a second audible alarm, and a second tactile alarm;

wherein the second visual alarm, the second audible alarm, and the second tactile alarm electrically connect to the second logic module.

17. The vehicle occupancy reminder device according to claim 16 wherein the first visual alarm is a visual alarm that is generated by the first logic module;

wherein the first visual alarm comprises one or more LEDs and a limit resistor that are electrically connected to the first logic module;

wherein the first logic module controls the operation of the first visual alarm;

wherein the first audible alarm is an audible alarm that is generated by the first logic module;

wherein the first audible alarm comprises a buzzer that is electrically connected to the first logic module;

wherein the first logic module controls the operation of the first audible alarm;

wherein the first tactile alarm is an audible alarm that is generated by the first logic module;

wherein the first tactile alarm comprises a vibration motor that is electrically connected to the first logic module;

wherein the first logic module controls the operation of the first tactile alarm;

wherein the second visual alarm is a visual alarm that is generated by the second logic module;

wherein the second visual alarm comprises one or more LEDs and a limit resistor that are electrically connected to the second logic module;

wherein the second logic module controls the operation of the second visual alarm;

wherein the second audible alarm is an audible alarm that is generated by the second logic module;

wherein the second audible alarm comprises a buzzer that is electrically connected to the second logic module;

wherein the second logic module controls the operation of the second audible alarm;

wherein the second tactile alarm is an audible alarm that is generated by the second logic module;

wherein the second tactile alarm comprises a vibration motor that is electrically connected to the second logic module;

wherein the second logic module controls the operation of the second tactile alarm.

18. The vehicle occupancy reminder device according to claim 17 wherein the force sensor is a sensor used to detect the weight of a passenger who is sitting in the child safety seat;

wherein the third logic module monitors the force sensor to determine if a passenger is in the child safety seat;

wherein the force sensor is positioned within the child safety seat such that the weight of the passenger rests on the force sensor;

wherein the force sensor is a piezoelectric device.

* * * * *